(12) United States Patent
Takahashi

(10) Patent No.: US 9,634,550 B2
(45) Date of Patent: Apr. 25, 2017

(54) INERTIAL DRIVE ACTUATOR

(71) Applicant: OLYMPUS CORPORATION, Tokyo (JP)

(72) Inventor: Masaya Takahashi, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 372 days.

(21) Appl. No.: 14/538,041

(22) Filed: Nov. 11, 2014

(65) Prior Publication Data

US 2015/0061463 A1 Mar. 5, 2015

Related U.S. Application Data

(63) Continuation of application No. PCT/JP2013/061394, filed on Apr. 17, 2013.

(30) Foreign Application Priority Data

May 17, 2012 (JP) .................................. 2012-113748

(51) Int. Cl.
*H02N 2/00* (2006.01)
*G01B 7/14* (2006.01)
(Continued)

(52) U.S. Cl.
CPC ........... *H02K 33/00* (2013.01); *H02K 41/033* (2013.01); *H02N 2/025* (2013.01); *H02N 2/062* (2013.01)

(58) Field of Classification Search
CPC .................................................. H01H 21/285
(Continued)

(56) References Cited

U.S. PATENT DOCUMENTS 5,144,208 A * 9/1992 Schiessle et al. ............. 318/118
7,808,153 B2 10/2010 Matsuki
(Continued)

FOREIGN PATENT DOCUMENTS

CN 102457155 A 5/2012
EP 2 117 057 A2 11/2009
(Continued)

OTHER PUBLICATIONS

International Search Report dated Jul. 30, 2013 issued in PCT/JP2013/061394.
(Continued)

*Primary Examiner* — Thomas Dougherty
(74) *Attorney, Agent, or Firm* — Scully, Scott, Murphy & Presser, P.C.

(57) ABSTRACT

An inertial drive actuator includes a displacement unit which generates a minute displacement in a first direction, and in a second direction, a coil which generates a magnetic flux, a movable object which has a surface facing at least one surface of the coil, and a first yoke which converges the magnetic flux generated by the coil, at a predetermined position, a detecting unit which detects an electric signal of the coil, reflecting a change in the magnetic flux near the coil based on a positional relationship of the movable object and the coil, and a judging unit which judges a position of the movable object, and the inertial drive actuator drives the movable object by controlling a frictional force acting on the movable object, by controlling the magnetic flux generated by the coil, and the coil carries out generation of the magnetic flux and detection of the magnetic flux.

6 Claims, 7 Drawing Sheets

(51) Int. Cl.
*H01L 41/00* (2013.01)
*H02K 33/00* (2006.01)
*H02N 2/02* (2006.01)
*H02N 2/06* (2006.01)
*H02K 41/03* (2006.01)

(58) Field of Classification Search
USPC ......... 310/26, 311, 328; 324/207.11, 207.15, 324/207.16, 207.21, 207.22
See application file for complete search history.

(56) References Cited

U.S. PATENT DOCUMENTS

| | | | |
|---|---|---|---|
| 2008/0111446 A1* | 5/2008 | Matsuki | 310/310 |
| 2008/0278840 A1* | 11/2008 | Matsuki | 360/71 |
| 2009/0189486 A1 | 7/2009 | Matsuki | |
| 2009/0277300 A1* | 11/2009 | Matsuki | 74/99 R |
| 2010/0127694 A1* | 5/2010 | Weickert | 324/207.16 |
| 2010/0171392 A1* | 7/2010 | Mukae | 310/328 |
| 2012/0091928 A1* | 4/2012 | Markon et al. | 318/135 |
| 2012/0098469 A1 | 4/2012 | Takeuchi | |
| 2012/0268055 A1 | 10/2012 | Takahashi et al. | |
| 2015/0048719 A1* | 2/2015 | Morishima | 310/323.16 |

FOREIGN PATENT DOCUMENTS

| | | | | |
|---|---|---|---|---|
| JP | 59-214702 | * | 12/1984 | ............... G01B 7/00 |
| JP | 11-136979 | * | 5/1999 | ............... H02N 2/00 |
| JP | Hei 11-136979 A | | 5/1999 | |
| JP | 2009-177974 A | | 8/2009 | |
| WO | WO 2011055427 A1 | | 5/2011 | |

OTHER PUBLICATIONS

English translation of International Preliminary Report on Patentability together with the Written Opinion dated Nov. 27, 2014 received in related International Application No. PCT/JP2013/061394.

* cited by examiner

INERTIAL DRIVE ACTUATOR

CROSS-REFERENCE TO RELATED APPLICATION

The present application is a continuation application of PCT/JP2013/061394 filed on Apr. 17, 2013 and claims a benefit of priority from the prior Japanese Patent Application No. 2012-113748 filed on May 17, 2012; the entire contents of which are incorporated herein by reference.

BACKGROUND OF THE INVENTION

Field of the Invention
The present invention relates to an inertial drive actuator.
Description of the Related Art
An actuator which displaces a drive shaft in an axial direction by supplying a saw-tooth wave drive pulse to an electromechanical transducer element fitted to a drive shaft, and moves a movable member which is friction-fit to the drive shaft in the axial direction, has been known. Hereinafter, such an actuator will be called as an 'inertial drive actuator'. Such inertial drive actuator is proposed in Japanese Patent Application Laid-open Publication No. 2009-177974, for example.

In a conventional inertial drive actuator, one end of a piezoelectric element is fixed to a fixed member, and the other end of the piezoelectric element is fixed to one end of a vibration substrate. A movable body which is movable in a direction of vibration of the piezoelectric element is disposed on the vibration substrate. Here, the fixed substrate or the vibration substrate is made of a magnetic material (such as iron, and stainless steel having a magnetic property), and an adsorbing portion is also a magnetic material. When an electric current is applied to a coil, a magnetic field is generated. The magnetic field that is generated also generates a magnetic field in the adsorbing portion. Due to the magnetic field generated in the adsorbing portion, a magnetic adsorptive force is generated in the vibration substrate or the fixed member which is a magnetic material, and as a result of which, the movable body and the vibration substrate make a close contact, and a frictional force is generated between the movable body and the vibration substrate.

SUMMARY OF THE INVENTION

An inertial drive actuator according to the present invention includes a displacement unit which generates a minute displacement in a first direction, and in a second direction which is opposite to the first direction, a coil which generates a magnetic flux in a direction different from a direction of the displacement unit, a movable object which has a surface facing at least one surface of the coil, and a first yoke which converges the magnetic flux generated by the coil, at a predetermined position, a detecting unit which detects an electric signal of the coil, reflecting a change in the magnetic flux near the coil based on a positional relationship of the movable object and the coil, and a judging unit which judges a position of the movable object based on an output of the detecting unit, and the inertial drive actuator drives the movable body by controlling a frictional force acting on the movable body, by controlling the magnetic flux generated from the coil, and the coil carries out generation of the magnetic flux and detection of the magnetic flux.

BRIEF DESCRIPTION OF THE DRAWINGS

FIG. 10 is a diagram showing a cross-sectional arrangement of the inertial drive actuator according to the first embodiment;

DETAILED DESCRIPTION OF THE INVENTION

Exemplary embodiments of an inertial drive actuator according to the present invention will be described below in detail by referring to the accompanying diagrams. However, the present invention is not restricted to the embodiments described below.

First Embodiment

Figure 1A:
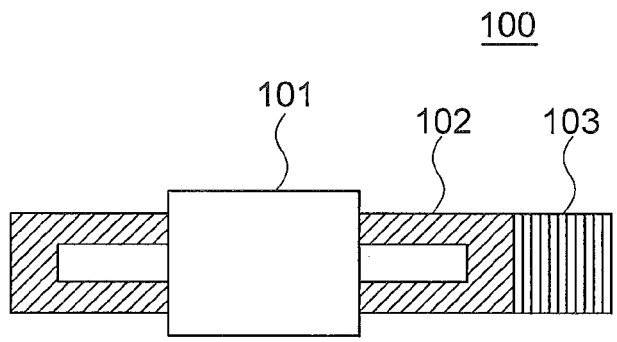
FIG. 1A is a diagram when an inertial drive actuator according to a first embodiment of the present invention is viewed from a top.
Figure 1B:
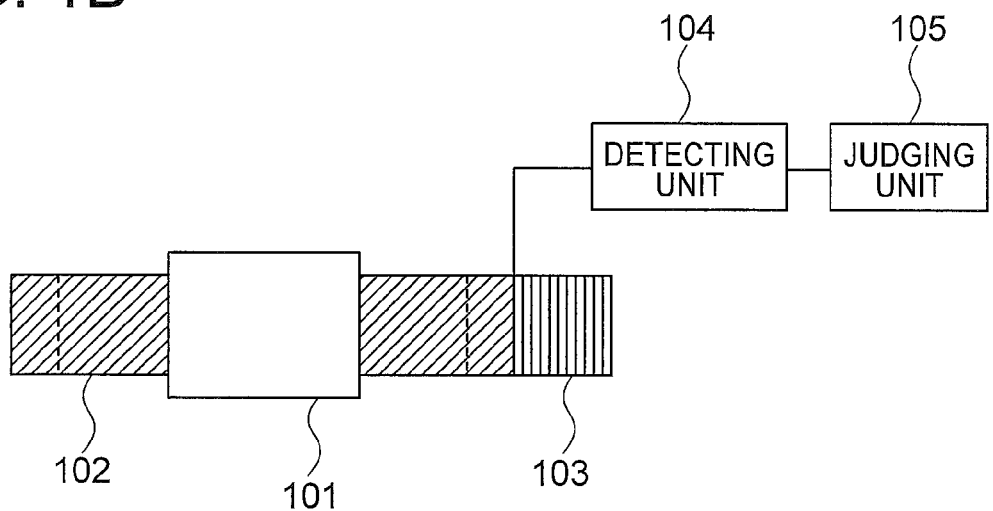
FIG. 1B is a diagram when the inertial drive actuator according to the first embodiment is viewed from a side.

An inertial drive actuator according to a first embodiment of the present invention will be described below by referring to FIG. 1A, FIG. 1B, and FIG. 10.

An inertial drive actuator 100 includes a movable body 101, a coil 102, a piezoelectric element 103, a detecting unit 104, and a judging unit 105.

The piezoelectric element 103 (displacement unit) generates a minute displacement in a first direction, and in a second direction which is opposite to the first direction.

The coil 102 generates a magnetic flux in a direction different from a direction of the piezoelectric element 103.

The movable body 101 (movable object) has a surface facing at least one surface of the coil 102, and forms a first yoke which converges the magnetic flux generated by the coil 102 at a predetermined position.

The detecting unit 104 detects an electric signal of the coil 102 reflecting a change in the magnetic flux near the coil based on a positional relationship of the movable body 101 and the coil 102.

The judging unit 105 judges a position of the movable body 101 based on an output of the detecting unit 104. Details of detection of the position of the movable body 101 will be described later in detail.

Moreover, the inertial drive actuator drives the movable body 101 by controlling frictional force acting between the movable body 101 and the coil 102, by controlling the magnetic flux generated from the coil 102.

The coil 102 carries out generation of the magnetic flux and detection of the magnetic flux.

Accordingly, the following effects are shown.

An amount of magnetic flux near the coil 102 changes according to the positional relationship of the coil 102 and the movable body 101.

The electric signal (impedance) of the coil 102 changes by changing of the amount of flux near the coil 102.

It is possible to detect the position of the movable body from the electric signal of the coil 102.

Next, an arrangement for detecting the position of the movable body 101 in the present embodiment will be described below in detail.

Firstly, in the arrangement of the present embodiment, the amount of magnetic flux near the coil 102 changes according to the relative positional relationship of the coil 102 and the movable body 101. Moreover, the electric signal (impedance) of the coil 102 changes by changing of the amount of magnetic flux near the coil 102.

Next, the change in the magnetic flux according to the position of the movable body 101 will be described below.

Figure 2A:
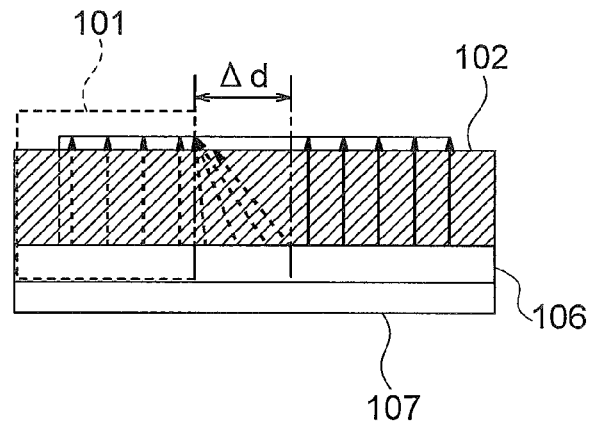
FIG. 2A, FIG. 2B, and FIG. 2C are diagrams explaining a principle of position detection of a movable body.
Figure 2B:
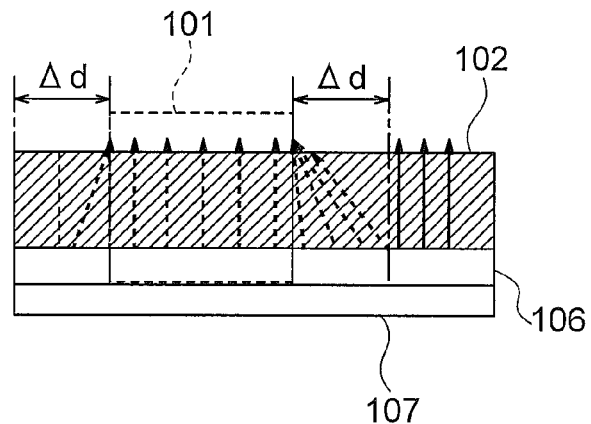
Figure 2C:
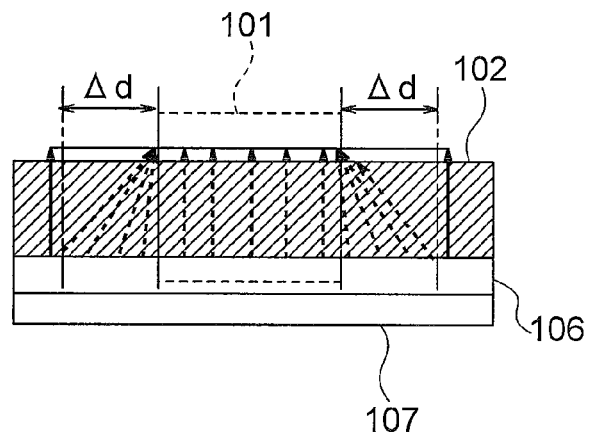

FIG. 2A, FIG. 2B, and FIG. 2C are diagrams showing a change in the magnetic flux at different positions of the movable body 101. In the diagrams, the movable body 101 is indicated by dashed lines, and the magnetic flux passing through an inner side of the coil 102 running through the movable body 101 is shown by thick dashed lines.

States of the movable body 101 moving from a left end toward a center with respect to the coil 102 are shown in order of FIG. 2A, FIG. 2B, and FIG. 2C. A movement from the center toward a right side being symmetrical to the movement from the left side toward the center, repetitive description is omitted.

For simplifying the description, in FIG. 2A, FIG. 2B, and FIG. 2C, a numerical quantity of an arrow indicated by dashed lines reflects a sum of the amount of magnetic flux that is transmitted through the movable body 101.

For simplifying the description, a distance $\Delta d$ in the diagrams denotes a distance through which the magnetic flux can be transmitted through the movable body 101, even at a position away from the movable body by the distance $\Delta d$. The description will be made below by referring to the diagrams in order of FIG. 2A, FIG. 2B, and FIG. 2C.

FIG. 2A is a state in which, the movable body 101 is at a position at the left end of the coil 102. The magnetic flux passing through an inner side of the coil 102 from a right side of the movable body 101 up to the distance $\Delta d$ flows to the movable body 101. Regarding an area to a right side of a right end of the distance (interval) $\Delta d$, since it becomes a leakage magnetic flux, the magnetic flux does not pass through the movable body 101.

An area on a left side of the inner side of the core or the coil 102 is not a site at which, the magnetic flux is generated. Therefore, in FIG. 2A, a portion of the movable body 101 covering the inner side of the coil 102 and an area equivalent to the distance $\Delta d$ on the right side become the amount of magnetic flux passing through the movable body 101.

FIG. 2B is a state in which, the movable body 101 has moved to a right side of a position of the coil 102 at the left end. Up to a position at the distance $\Delta d$ from the right side of the movable body 101, the magnetic flux passing through the inner side of the coil 102 flows through the movable body 101 similarly as in FIG. 2A.

Moreover, an area on a right side of a position at the distance $\Delta d$ from the right side of the movable body 101 becomes the leakage magnetic flux. Therefore, the magnetic flux does not pass through the movable body 101. Similarly as an area of the right side, also an area on the left side of the movable body 101, up to a position at the distance $\Delta d$, the magnetic flux passing through the inner side of the coil flows to the movable body 101. Moreover, the core or the inner side of the coil 102 being within a range of the distance $\Delta d$, a magnetic flux up to a part of the distance $\Delta d$ on the left side flows to the movable body 101.

Consequently, from the left side of the movable body 101 up to an inner-side end portion of the coil 102, a portion of the movable body 101, and an area equivalent to distance $\Delta d$ from the right side of the movable body 101, in FIG. 2B, becomes the amount of magnetic flux passing through the movable body 101.

FIG. 2C is a state in which, the movable body 101 is positioned at a center of the coil 102. Up to an area at the distance $\Delta d$ from the right side of the movable body 101 and an area at the distance $\Delta d$ from the left side of the movable body 101, the magnetic flux passing through the inner side of the coil 101 flows to the movable body 101.

Consequently, a portion equivalent to the area at the distance $\Delta d$ from the left side of the movable body 101, a portion of the movable body 101, and a portion equivalent to the area at the distance $\Delta d$ from the right side of the movable body 101 becomes the amount of magnetic flux passing through the movable body 101.

From the abovementioned description, regarding the amount of magnetic flux passing through the magnetic body 101, when the three states of FIG. 2A, FIG. 2B, and FIG. 2C are compared, a state in which, the amount of magnetic flux passing through the movable body 101 is large is a state indicated by diagrams in order of FIG. 2C, FIG. 2B, and FIG. 2A. Consequently, in the present embodiment, a state in which, the movable body 101 is positioned at the center of the coil 102, the amount of magnetic flux passing through the movable body 101 is the largest. Moreover, with the movable body 101 moving to the end portion of the coil 102, the amount of magnetic flux passing through the movable body 101 decreases.

In FIG. 2A, FIG. 2B, and FIG. 2C, although a magnet 106 and a yoke 107 are provided, the magnet 106 and the yoke 107 are not components which are indispensable for the present description.

Next, a relationship between a position of the movable body 101 and a change in the magnetic flux will be described below by referring to FIG. 3.

According to the state in which the movable body 101 is positioned at the center of the coil 102 described in FIG. 2A, FIG. 2B, and FIG. 2C, the magnetic flux passing through the movable body 101 is prone to increase. FIG. 3 shows a relationship of the position of the movable body 101 and the amount of magnetic flux passing through the movable body 101.

Figure 3:
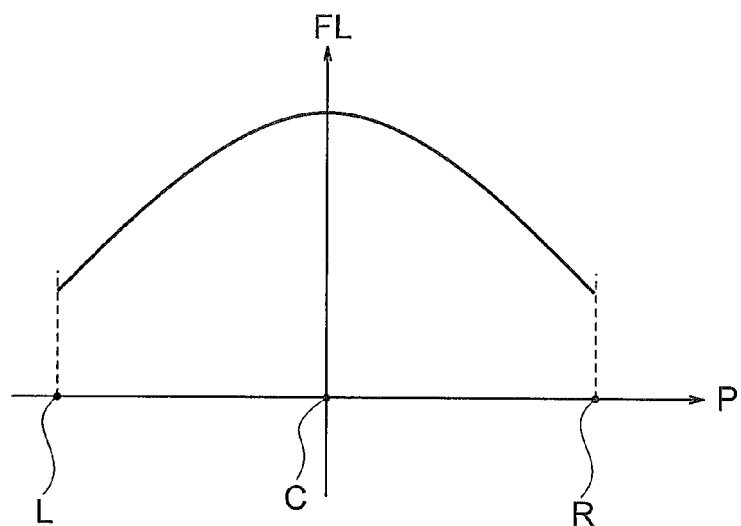
FIG. 3 is a diagram explaining a relationship of a change in position of the movable body and a change in a magnetic flux.

In FIG. 3, a horizontal axis P indicates the position of the movable body 101. With respect to the coil 102, a position at a center of the movable body 101 is denoted by C, a position at a right end of the movable body 101 is denoted by R, and a position at a left end of the movable body 101 is denoted by L. A vertical axis FL indicates the amount of magnetic flux.

When an alternate current is applied to the coil 102, the amount of magnetic flux passing through the movable body 101 also changes with the alternate current. Therefore, a counter electromotive force due to the change in the amount of magnetic flux is generated, and the counter electromotive force has an effect on the coil 102.

The change in the amount of magnetic flux passing through the movable body 101 near the coil 102 induces a change in the counter electromotive force which has an effect on the coil 102. Therefore, if the magnetic flux passing through the movable body 101 is large, a resistance and inductance become larger as compared to the resistance and the inductance when the magnetic flux passing through the movable body 101 is small.

Consequently, regarding the resistance and the inductance of the coil 102, there is a tendency similar to the change in the amount of magnetic flux passing through the movable body 101 shown in FIG. 3. As shown in FIG. 3, since there is a dependence on the position of the movable body 101, in the present embodiment, an arrangement is such that, detection of the position of the movable body 101 is possible.

Practically, a magnetic flux other than the amount of magnetic flux passing through the movable body 101 also has an effect on the impedance. As a result, the magnetic flux other than the amount of magnetic flux passing through the movable body 101 is reflected in the amount of magnetic flux passing through the movable body 101. Therefore, the change in an electric signal of the coil 102 according to the position of the movable body 101 is explained by the amount of magnetic flux passing through the movable body 101.

Figure 1C:
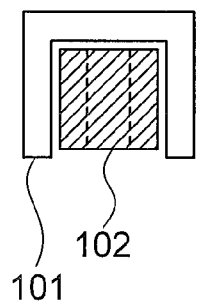

The description will be continued returning to FIG. 1A, FIG. 1B, and FIG. 1C. The inertial drive actuator 100 according to the present embodiment includes the coil 102, the piezoelectric element 103, the detecting unit 104, and the judging unit 105. The movable body 101 is a magnetic body. The movable body 101 functions as a yoke (first yoke) which closes the magnetic flux generated by the coil 102. Closing of the magnetic flux is shown by arrow marks in FIG. 6C for example.

Moreover, the coil 102 is connected to the detecting unit 104, and an electric output signal of the coil 102 is detected. The position of the movable body 101 is judged by the judging unit 105 by an output from the detecting unit 104. A relationship of the position of the movable body 101 and the electric signal of the coil 102 is as aforementioned.

According to the position of the movable body 101, the amount passing through the movable body 101 of the magnetic flux generated by the coil 102 changes. When the amount of magnetic flux passing through the movable body 101 is large, the resistance and an inductance of the coil 102 increase by the effect of the counter electromotive force. Therefore, it is possible to detect the position of the movable body 101 by detecting the impedance of the coil 102.

The detecting unit 104 is a detecting circuit which detects the impedance of the coil 102. By an output signal from the detecting unit 104 which reflects an impedance value, the position is judged in the judging unit 105. Furthermore, by comparing with an output signal immediately before, from the detecting unit 104, the judging unit 105 is capable of judging not only the position but also a direction in which the movable body 101 moves.

Accordingly, the following effects are shown.

It is possible to detect the position by detecting a real part of impedance (resistance).

It is possible to detect the position by detecting an imaginary part of impedance (inductance).

It is possible to detect the position by detecting a magnitude of the impedance.

Since the inductance has a small temperature dependency, the detection of inductance is effective from a view point of an effect of temperature.

Moreover, by feeding back information of the position of the movable body judged by the judging unit 105 to an actuator driving circuit which is not shown in the diagram, a position control drive is possible.

In the present embodiment, a friction control of the inertial drive actuator is carried out by a change of a magnetic force. Moreover, it is possible to prevent deterioration due to wearing by repeated drive.

Furthermore, an arrangement is let to be such that, the magnetic flux generated for controlling the frictional force of the movable body 101, which an electromagnetic coil generates is closed via the movable body 101. If a path of the magnetic flux which controls the frictional force is let to be a path of a driving magnetic flux, an amount of magnetic flux of the path of the driving magnetic flux changes according to the position of the movable body 101.

Therefore, a flow of the magnetic flux near the coil 102 changes according to a positional relationship of the movable body 101 and the electromagnetic coil. For this reason, by detecting electrical characteristics of the electromagnetic coil, the detection of the position of the movable body 101 becomes possible. By doubling the electromagnetic coil as a drive and position detection, there is no increase in an actuator size as compared to an actuator size in an arrangement in which, a displacement sensor is added separately, and it is possible to provide an inertial drive actuator which is capable of detecting position.

Second Embodiment

Figure 4A:
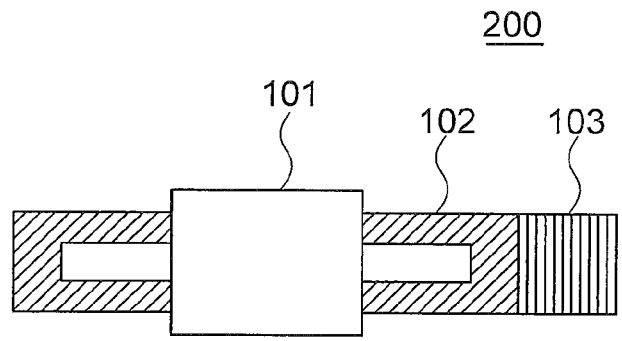
FIG. 4A is a diagram when an inertial drive actuator according to a second embodiment of the present invention is viewed from a top.

Next, an inertial drive actuator 200 according to a second embodiment of the present invention will be described below by referring to FIG. 4A, FIG. 4B, and FIG. 4C.

Same reference numerals are assigned to components which are same as in the abovementioned first embodiment, and repetitive description is omitted. In the present embodiment, an arrangement is such that, a core 201 (second yoke) which is a magnetic body provided at an inner side of the coil 102 is added further to the arrangement of the inertial drive actuator 100 of the first embodiment.

In other words, a second yoke of which, at least a part is inserted in to the inner side of the coil 102, has been disposed.

Accordingly, the following effects are shown.
A change in the magnetic flux according to the position due to a presence of the core 201 in the coil increases.
Sensitivity of detection improves.
It is possible to suppress a deformation of the coil 102.

The effects shown will be described more concretely. By the presence of the core 201, the amount of flux generated by the coil 102 becomes large. Accordingly, an output signal of the coil 102 which reflects the position of the movable body 101 becomes large. As a result of this, the sensitivity of detection of the position of the movable body 101 improves.

Figure 4B:
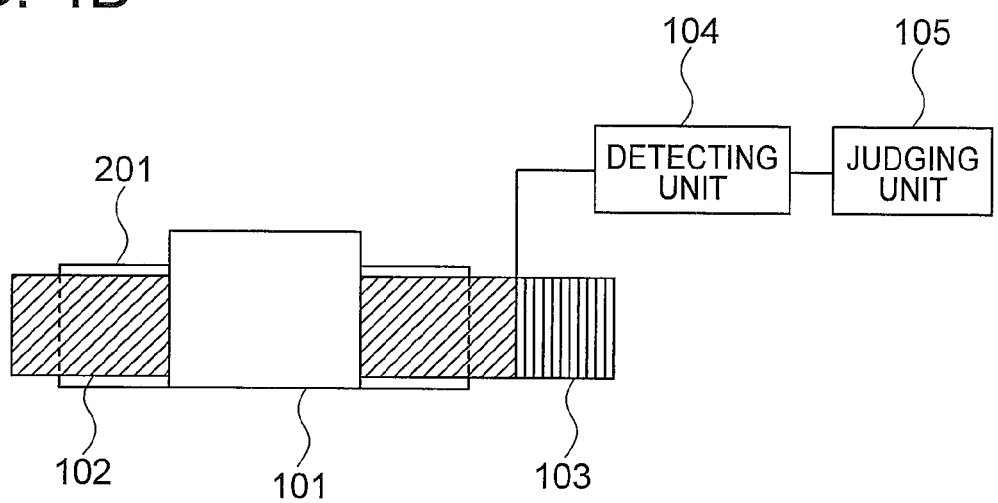
FIG. 4B is a diagram when the inertial drive actuator according to the second embodiment is viewed from a side.
Figure 4C:
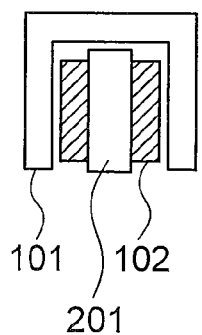
FIG. 4C is a diagram showing a cross-sectional arrangement of the inertial drive actuator according to the second embodiment.

In FIG. 4B and FIG. 4C, the core 201 is provided only at the inner side of the coil 102. Without restricting to such an arrangement, the core 201 may be disposed to be sticking out of the coil 102 (leftward-rightward direction and a frontward rearward direction of a paper surface). For instance, the core 201 may be disposed up to an outer side of the coil 102, and may be disposed to be extended up to a vicinity of a lower side of the movable body 101. Accordingly, an effect of closing the magnetic flux of the coil 102 via the movable body 101 improves.

Third Embodiment

Figure 5A:
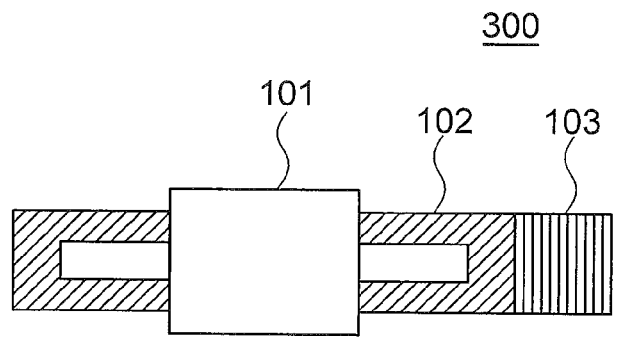
FIG. 5A is a diagram when an inertial drive actuator according to a third embodiment of the present invention is viewed from a top.
Figure 5B:
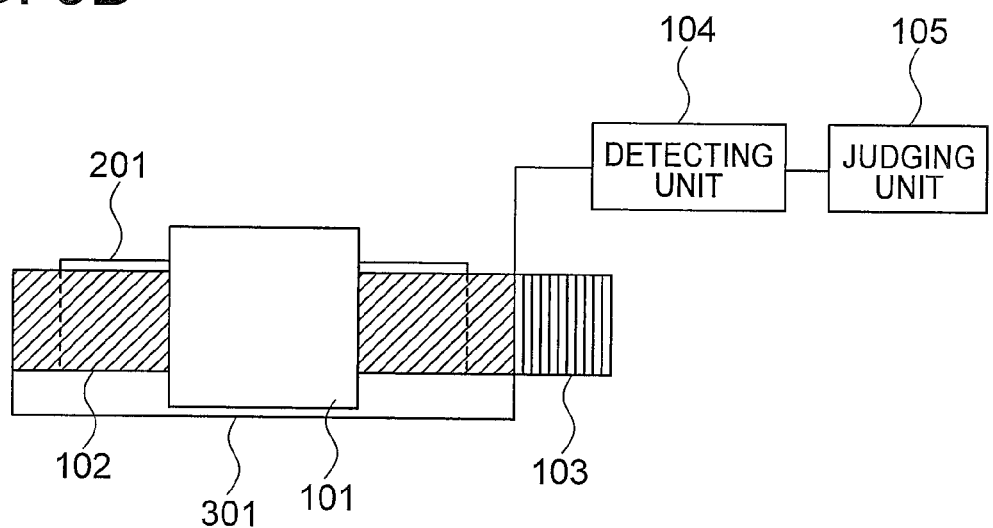
FIG. 5B is a diagram when the inertial drive actuator according to the third embodiment is viewed from a side.
Figure 5C:
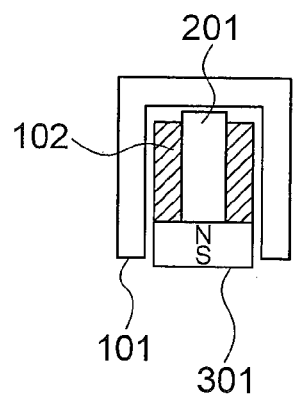
FIG. 5C is a diagram showing a cross-sectional arrangement of the inertial drive actuator according to the third embodiment.

Next, an inertial drive actuator 300 according to a third embodiment of the present invention will be described below by referring to FIG. 5A, FIG. 5B, and FIG. 5C.

Same reference numerals are assigned to components which are same as in the abovementioned embodiments, and repetitive description is omitted.

In the present embodiment, an arrangement is such that a magnet 301 is added to a lower side of the core 201, or to a lower side of the coil 102.

Here, the magnet 301 is disposed such that the magnetic flux is generated in a direction same as the direction in which, the coil 102 generates the magnetic flux.

Accordingly, the following effects are shown.
It is possible to hold the movable body 101 all the time.
The change in the magnetic flux according to the position of the movable body 101 increases by an amount of magnetic flux of the magnet.
Sensitivity of detection improves.

The abovementioned effects will be described more concretely. By providing the magnet 301, the magnetic flux is generated all the time. Therefore, even in a state in which, the coil 102 does not generate a magnetic field, there exists a magnetic path which closes the magnetic flux via the movable body 101 similarly as for the magnetic flux generated by the coil 102.

Accordingly, since a force in a direction of the coil acts on the movable body 101 all the time, the movable body 101 is held. Moreover, an amount of magnetic flux via the movable body 101 becomes large by an amount of the magnetic flux of the magnet 301. Therefore, the sensitivity of detection of the position of the movable 101 improves.

Fourth Embodiment

Figure 6A:
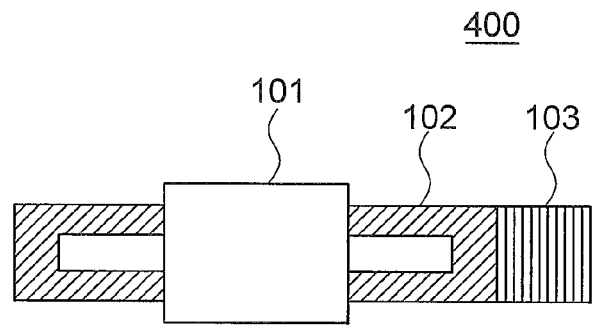
FIG. 6A is a diagram when an inertial drive actuator according to a fourth embodiment of the present invention is viewed from a top.
Figure 6B:
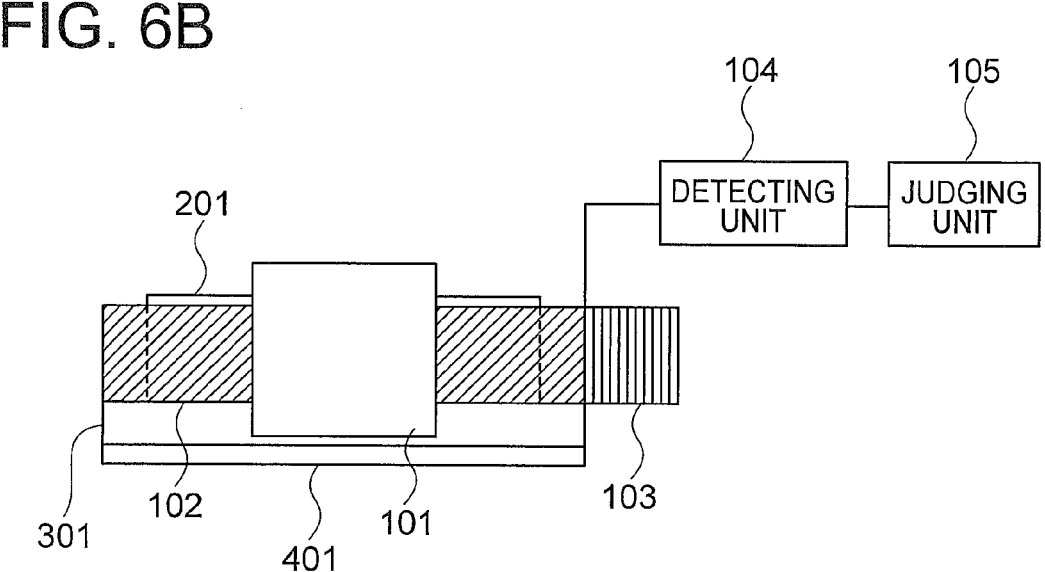
FIG. 6B is a diagram when the inertial drive actuator according to the fourth embodiment is viewed from a side.

Next, an inertial drive actuator 400 according to a fourth embodiment of the present invention will be described below by referring to FIG. 6A, FIG. 6B, and FIG. 6C.

Same reference numerals are assigned to components which are same as in the abovementioned embodiments, and repetitive description is omitted.

The present embodiment is an arrangement in which, a third yoke 401 which is a magnetic body is added to a lower side of the magnet 301.

In other words, the movable body 101 has the third yoke 401 on an opposite side of a side facing the coil 102.

Accordingly, the following effects are shown.
An amount of a main magnetic flux (magnetic flux involved in drive and detection) increases.
Sensitivity of detection improves.
It is possible to induce magnetic flux of magnet.

The abovementioned effects will be described more concretely. By the presence of the third yoke 401, an amount of magnetic flux passing through a magnetic path of the magnetic flux generated from the magnet 301 and the coil 102 via the movable body 101 increases. Therefore, the sensitivity of detection of the position of the movable body 101 improves.

Figure 6C:
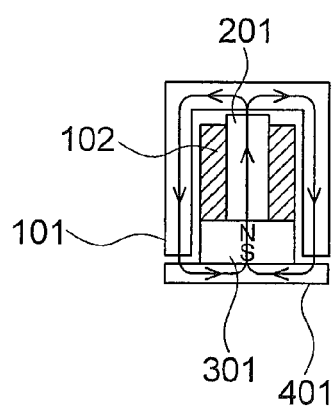
FIG. 6C is a diagram showing a cross-sectional arrangement of the inertial drive actuator according to the fourth embodiment.

In FIG. 6C, a direction of the magnetic flux generated by the coil 102 and a direction of the magnetic flux generated by the magnet 301 are let to be parallel. The magnetic flux, upon passing through the core 201, passes through the movable body 101, and is transmitted to the third yoke 401 at the lower side of the movable body 101, and then transmitted to the magnet 301. The magnetic flux passing through the movable body 101 is closed. A leakage magnetic flux which does not pass through the movable body 101 does not contribute to the drive, and also does not contribute to an electric signal of the coil 102 reflecting the position detection. Consequently, making the leakage magnetic flux small and the amount of magnetic flux passing through the movable body 101 large is effective for drive and the position detection.

Fifth Embodiment

Figure 7A:
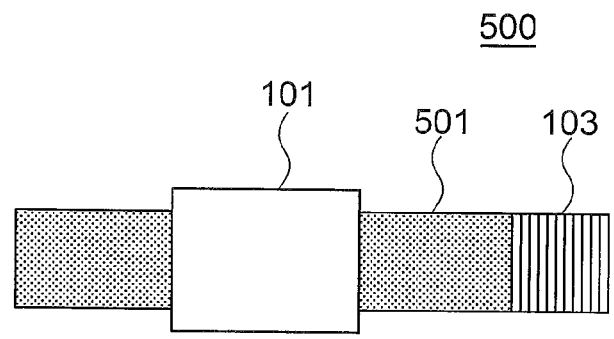
FIG. 7A is a diagram when an inertial drive actuator according to a fifth embodiment of the present invention is viewed from a top.
Figure 7B:
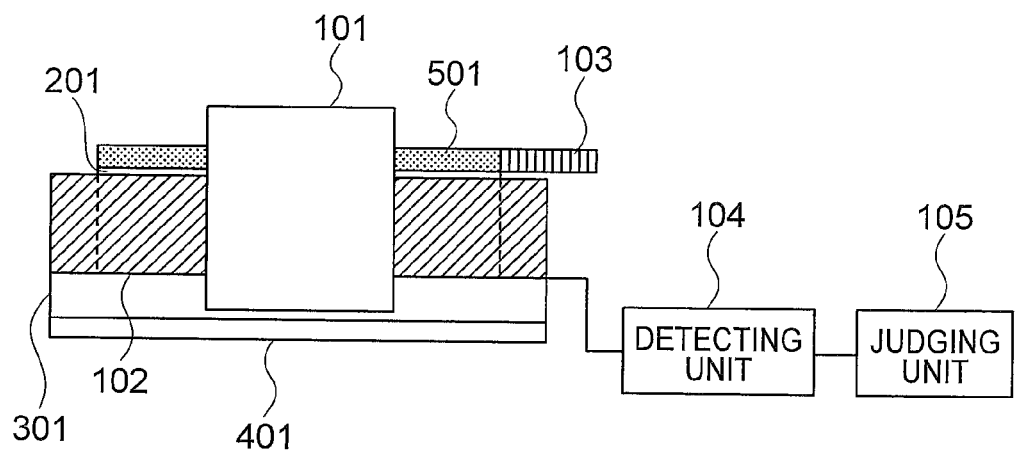
FIG. 7B is a diagram when the inertial drive actuator according to the fifth embodiment is viewed from a side.
Figure 7C:
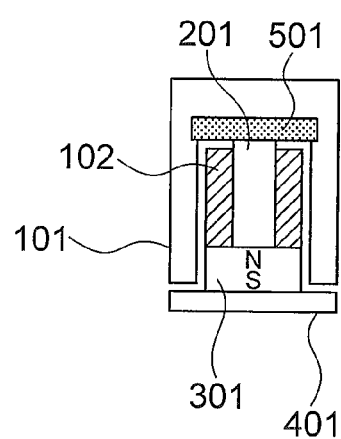
FIG. 7C is a diagram showing a cross-sectional arrangement of the inertial drive actuator according to the fifth embodiment.

Next, an inertial drive actuator 500 according to a fifth embodiment of the present invention will be described below by referring to FIG. 7A, FIG. 7B, and FIG. 7C.

Same reference numerals are assigned to components which are same as in the abovementioned embodiments, and repetitive description is omitted.

The present embodiment is an arrangement in which, a vibration plate 501 is added between the movable body 101 and the coil 102.

In other words, in the present embodiment, the inertial drive actuator 500 has the vibration plate 501 between the movable body 101 and the coil 102, and the vibration plate 501 is displaced with the displacement of the piezoelectric element 103 (displacement unit).

Accordingly, the following effects are shown.
A vibrating portion becomes small.
It is possible to suppress generation of heat due to small-sizing of the piezoelectric element 103.
It is possible to protect the coil 102.

The abovementioned effects will be described more concretely. A site that vibrates minutely due to the piezoelectric element 103 is the vibration plate 501 only. Accordingly, it becomes possible to use the piezoelectric element 103 of a further smaller size. As a result, it is possible to reduce electrical power consumption by the piezoelectric element 103, and to suppress the generation of heat. Moreover, the coil 102 and the piezoelectric element 103 are not in contact. Therefore, an effect of protecting the coil 102 is also shown.

As described heretofore, the present invention is useful for an inertial drive actuator in which, detection of a position of a movable body is possible without making a size of the inertial drive actuator large.

According to the present invention, an effect that it is possible to provide an inertial drive actuator which is capable of detecting a position of a movable body, without making the size of the inertial drive actuator large.

What is claimed is:
1. An inertial drive actuator comprising:
  a displacement unit which generates a minute displacement in a first direction, and in a second direction which is opposite to the first direction;
  a coil which generates a magnetic flux in a direction different from a direction of the displacement unit;
  a movable object which has a surface facing at least one surface of the coil, and a first yoke which converges the magnetic flux generated by the coil, at a predetermined position;

a detecting unit which detects an electric signal of the coil, reflecting a change in the magnetic flux near the coil based on a positional relationship of the movable object and the coil; and a judging unit which judges a position of the movable object based on an output of the detecting unit, wherein the inertial drive actuator drives the movable object by controlling a frictional force acting on the movable object by controlling the magnetic flux generated from the coil, and the coil carries out generation of the magnetic flux and detection of the magnetic flux.

2. The inertial drive actuator according to claim 1, wherein the detecting unit is an impedance detecting circuit.

3. The inertial drive actuator according to claim 1, wherein a second yoke of which, at least a part is inserted into an inner side of the coil, is disposed.

4. The inertial drive actuator according to claim 1, wherein a magnet is disposed such that a magnetic flux is generated in a direction same as the direction of the magnetic flux generated by the coil.

5. The inertial drive actuator according to claim 3, comprising:

a third yoke on an opposite side of a direction in which, the movable object is facing the coil.

6. The inertial drive actuator according to claim 1, comprising:

a vibration plate between the movable object and the coil, wherein the vibration plate is displaced with the displacement of the displacement unit.

* * * * *